United States Patent Office 3,293,198
Patented Dec. 20, 1966

3,293,198
FOAMED PRODUCTS AND PROCESS THEREFOR
Donald E. Jefferson, Greenbelt, Md., assignor to W. R. Grace & Co., New York, N.Y., a corporation of Connecticut
No Drawing. Filed Nov. 20, 1963, Ser. No. 325,163
17 Claims. (Cl. 260—2.5)

This application is a continuation-in-part of application having Serial Number 172,081 filed February 9, 1962, now abandoned.

This invention relates to foamed products and a process therefor. More particularly this invention is concerned with forming foamed products in situ at ambient conditions from vinylidene monomers.

In a copending application having Serial No. 101,328, filed April 4, 1961, now Patent No. 3,117,112 and assigned to the same assignee there is described a process for polymerizing vinyl and acrylic monomers in the presence of a catalyst consisting essentially of an aluminum alkyl compound and free oxygen under ambient conditions.

Since it is known in the art that azo compounds e.g. 2,2′-azobis[isobutyronitrile] can be used as blowing or foaming agents it was postulated that if sufficient 2,2′-azobis[isobutyronitrile] were employed with free oxygen and an aluminum alkyl compound in the polymerization of vinylidene monomers, the resultant product would be a stable foamed polymer. Repeated experiments showed that although a polymer product having a cellular structure was formed, the product was unstable and lacked sufficient body to support itself in its expanded cellular form. As soon as the gas from the decomposition of the blowing agent dissipates, the cell structure collapses.

It has now been found that a stable foamed polymeric product can be formed at ambient conditions from non-gaseous vinylidene monomers, by subjecting said monomers at room temperature and atmospheric pressure, i.e. ambient conditions, to the action of a catalyst consisting essentially of free oxygen and an aluminum alkyl compound of the formula $$R-Al\begin{smallmatrix}R'\\ \\R'\end{smallmatrix}$$

wherein R is a member of the group consisting of hydrogen, a halide and an alkyl and R′ is an alkyl, all of said alkyl groups having 1 to 8 carbon atoms, a combination catalyst and foaming agent consisting essentially of 2,2′-azobis[isobutyronitrile] and a multifunctional monomer member of the group consisting of triallyl cyanurate, diallyl itaconate, triallyl aconitate, diallyl oxalate, allyl acrylate and allyl methacrylate.

As used herein the term "vinylidene monomer," in regard to the polymerizable monomers which form foam products, means a non-gaseous polymerizable monoethylenic compound in which the sole aliphatic carbon to carbon unsaturation is in the double bond in the vinylidene radical, i.e.

$$H_2C=C\begin{smallmatrix}\diagup\\ \\\diagdown\end{smallmatrix}$$

and the compound has the formula $$CH_2=C\begin{smallmatrix}R_1\\ \\R_2\end{smallmatrix}$$

wherein $R_1$ is hydrogen or an organic radical and $R_2$ is an organic radical.

The term "non-gaseous" merely signifies that the vinylidene monomer is not a gas under standard conditions of temperature and pressure. In short, the vinylidene monomer is either a liquid or a solid at standard conditions.

The vinylidene monomers are well known in the art. Classes of vinylidene monomers operable in this invention include, but are not limited to:

(1) Esters of acrylic and methacrylic acid of the formula:

$$H_2C=\overset{X}{\underset{|}{C}}-\overset{O}{\underset{\|}{C}}-O-R$$

wherein X is a member of the group consisting of hydrogen and methyl and R is a radical of the group consisting of alkyl and aryl, said radical members containing up to 18 carbon atoms.

(2) Vinyl esters of saturated monocarboxylic acids of the formula:

$$H_2C=CH-O-\overset{O}{\underset{\|}{C}}-R$$

wherein R is a radical of the group consisting of alkyl and aryl, said radical members containing up to 18 carbon atoms.

(3) Vinyl ethers of the formula:

$$H_2C=CH-O-R$$

wherein R is an alkyl containing 1 to 18 carbon atoms.

(4) Amides of acrylic and methacrylic acid of the formula:

$$CH_2=\overset{X}{\underset{|}{C}}-\overset{O}{\underset{\|}{C}}-N\begin{smallmatrix}R\\ \\R\end{smallmatrix}$$

wherein X is a member of the group consisting of hydrogen and methyl and R is a radical of the group consisting of alkyl and aryl, said radicals not necessarily being the same and containing in combination up to 18 carbon atoms.

(5) Vinyl ketones of the formula:

$$H_2C=CH-\overset{O}{\underset{\|}{C}}-R$$

wherein R is a radical of the group consisting of alkyl and aryl, said radical members containing up to 18 carbon atoms.

(6) Styrenes of the formula:

wherein $n$ is an integer from 1 to 3 and R is a member of the group consisting of halogen, hydrogen, alkoxy and alkyl, said alkoxy and alkyl members containing 1 to 4 carbon atoms.

In all the aforestated formulas, substitution in the R groups is permissible when R is an alkyl, aryl or alkoxy group.

Operable esters of acrylic and methacrylic acid in this invention include, but are not limited to methyl acrylate; ethyl acrylate; n-propyl acrylate; isopropyl acrylate; n-butyl acrylate; isobutyl acrylate; sec-butyl acrylate; tert-butyl acrylate; n-pentyl acrylate; n-hexyl acrylate; 2-ethylbutyl acrylate; 2-ethylhexyl acrylate; n-heptyl acrylate; n-octyl acrylate; 3,5,5-trimethylhexyl acrylate; octadecyl acrylate; cyclopentyl acrylate; cyclohexyl acrylate; n-decyl acrylate; tridecyl acrylate; 3,3,5-trimethylcyclohexyl acrylate; 2-n-butoxyethyl acrylate; 2-ethoxyethyl acrylate; 3-ethoxypropyl acrylate; 3-methoxybutyl acrylate; 2-methoxyethyl acrylate; benzyl acrylate; 2-phenoxyethyl acrylate; phenyl acrylate; 2-phenylethyl acrylate; 2-bromoethyl acrylate; 2-chloroethoxyethyl acrylate; 2-chloroethyl acrylate; 2,2,2-trifluoroethyl acrylate; N,N-diethylaminoethyl acrylate; 1,1-dihydroheptafluorobutyl acrylate; N,N-dimethylaminoethyl acrylate; 2-N-morpholinoethyl acrylate; tetrahydrofurfuryl acrylate; and the like.

Other methacrylate monomers include: n-amyl methacrylate; iso-amyl methacrylate; benzyl methacrylate; 2-bromoethyl methacrylate; 2,2-butoxyethyl methacrylate; sec-butyl methacrylate; iso-butyl methacrylate; tert-butyl methacrylate; 2-chloroethyl methacrylate; beta-cyanoethyl methacrylate; cyclohexyl methacrylate; cyclopentyl methacrylate; n-decyl methacrylate; N,N-diethylaminoethyl methacrylate; 1,1-dihydroheptafluorobutyl methacrylate; tert-butylaminoethyl methacrylate; 2-chloroethoxyethyl methacrylate; N,N-dimethylaminoethyl methacrylate; 2-ethoxyethyl methacrylate; ethylene dimethacrylate; 2-ethylhexoxyethyl methacrylate; 2-ethylhexyl methacrylate; ethyl methacrylate; n-heptyl methacrylate; n-hexyl methacrylate; n-lauryl methacrylate; lauryl methacrylate; 3-methoxybutyl methacrylate; 2-methoxyethyl methacrylate; methyl methacrylate; octadecyl methacrylate; octyl methacrylate; n-octyl methacrylate; 2-phenoxyethyl methacrylate; 2-phenylethyl methacrylate; n-propyl methacrylate; iso-propyl methacrylate; 3,3,5-trimethylcyclohexyl methacrylate; 3,5,5-trimethylhexyl methacrylate; vinyl methacrylate; and the like.

Operable vinyl esters include, but are not limited to, vinyl formate; vinyl butyrate; vinyl acetate; vinyl n-decanoate; vinyl 2-ethylhexoate; vinyl laurate; vinyl n-octanoate; vinyl oleate; vinyl benzoate; vinyl propionate; vinyl stearate; vinyl octadecylate; vinyl 2-methyl benzoate; vinyl 1-naphtholate and the like.

Vinyl ethers which are suitable for use include, but are not limited to, vinyl methyl ether; vinyl ethyl ether; vinyl n-butyl ether; vinyl isobutyl ether; vinyl 2-chloroethyl ether; vinyl 2-ethylhexyl ether; vinyl 2-methoxyethyl ether; vinyl decyl ether; vinyl 1-octadecyl ether and the like.

Suitable amides of acrylic and methacrylic acid include, but are not limited to, acrylamide; N-methacrylamide; N-tert-butylacrylamide; di-n-butylacrylamide; N,N-diethylacrylamide; dinonyl acrylamide; methacrylamide; N-(beta-naphthyl) methacrylamide; N-(para-chlorophenyl)-methacrylamide; dinonyl methacrylamide; N,N-diethyl methacrylamide; N,N-dimethyl methacrylamide; and the like.

Workable vinyl ketones in the instant invention include, but are not limited to, methyl vinyl ketone; ethyl vinyl ketone; n-butyl vinyl ketone; tert. butyl vinyl ketone; hexyl vinyl ketone; decyl vinyl ketone; octadecyl vinyl ketone; 4-chlorohexyl vinyl ketone and the like.

Operable styrenes include, but are not limited to, styrene; p-bromostyrene; 2-chlorostyrene; 3-chlorostyrene; 4-chlorostyrene; 2,5-dichlorostyrene; 2-methylstyrene; 3-ethylstyrene; 4-ethylstyrene; 2-butylstyrene; 2-isopropylstyrene; 4-n-propylstyrene; 2-methoxystyrene; 2-ethoxystyrene; 4-butoxystyrene and the like.

In order to form stable foams by the practice of this invention it is critical that the vinylidene monomer contain solely a terminably situated aliphatic carbon to carbon unsaturation, and said unsaturation is in the double bond in the vinylidene radical. The reason for this is that the presence of other aliphatic carbon to carbon unsaturation in the monomer causes chain transfer reactions which results in low molecular weight polymer which does not form stable foams. Thus any non-gaseous vinylidene monomer containing only one aliphatic carbon to carbon unsaturation which is terminally located in the vinylidene radical is operable in this invention.

The aluminum alkyl compound in the catalyst may also be used in complex form to polymerize the vinylidene monomers of the instant invention. The aluminum alkyl compound can be complexed with saturated or unsaturated monocarboxylic esters of the formula:

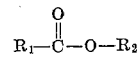

wherein $R_1$ and $R_2$ are alkyl groups containing in combination up to 20 carbon atoms. $R_1$ and $R_2$ can be saturated or unsaturated without affecting the operability of the instant invention. Examples of these complexing esters include but are not limited to ethyl acetate, ethyl propionate, vinyl propionate, vinyl acetate, ethyl acrylate, butyl acrylate, methyl methacrylate, methyl formate, methyl acetate, methyl palmitate, octyl octanoate, methyl acrylate, vinyl acrylate, methyl undecanoate, hexyl undecanoate and the like. Other operable known complexing materials for aluminum alkyl compounds are well known to those skilled in the art and include amides, amines and the like, such as pyridine, ammonia, diethyl amine, triethyl amine, butyl amine and dimethyl acetamide. The complex can be made by preforming a mixture of the aluminum alkyl compound with the aforesaid saturated or unsaturated monocarboxylic esters or other known complexing material in a mole ratio of 1:1 and thereafter adding said complex to the monomer mixture. The use of the aluminum alkyl in complex form as a catalyst component decreases the exotherm of the reaction and allows for better temperature control. When the aluminum alkyl compound is used in the system without complexing, the exothermic reaction between the aluminum alkyl compound and oxygen is sometimes too rapid and of such magnitude that the heat therefrom causes the 2,2′-azobis[isobutyronitrile] to thermally decompose before the polymer solution has attained a sufficiently high viscosity to contain the foaming agent. Where this happens, the nitrogen gas escapes, thus making inefficient use of the foaming agent. Hence although the aluminum alkyl compound is operable without complexing, it is preferable to employ said compound in a complex form in the instant invention.

The amount of aluminum alkyl compound used as a catalyst in this invention is not critical and may be varied considerably. Relatively small amounts are operable to form relatively large amounts of polymer. In general, a practical range is 0.001 to 0.1 mole preferably 0.01–0.05 mole, of aluminum alkyl compound per mole of monomer to be polymerized. Even larger amounts of aluminum alkyl compound are operable but are unnecessary.

Examples of some operable aluminum alkyl compounds include but are not limited to triethyl aluminum, triisobutyl aluminum, trioctyl aluminum, diethyl aluminum chloride, diisobutyl aluminum hydride, diethyl aluminum hydride, all either per se or complexed with the aforesaid monocarboxylic ester, e.g. butyl acrylate, vinyl acetate, vinyl propionate, ethyl acetate, methyl methacrylate, methyl acrylate and the like.

The function of the 2,2′-azobis[isobutyronitrile] in the instant invention is two-fold. It not only acts as a blowing or foaming agent but is also an integral component of the catalyst system. When the 2,2′-azobis[isobutyronitrile] thermally decomposes in the range 60–70° C. it releases free radicals useful for further polymerization and nitrogen as a blowing or foaming agent.

It should be understood that fillers, pigments, plasticizers and thickeners such as preformed polymers and the like can be added to the monomer mixture prior to forming foamed products within the scope of this invention. Examples of fillers employed include but are not limited to kaolin clay, calcium carbonate, ground polymethyl methacrylate, carbon black, metallic oxides operable as paint, grade pigments, ground metallic powder, silica, talcum powder and the like.

The reaction when initiated in air at room temperature i.e. 25° C. is autogenous. The heat of the polymerization reaction initiated by the aluminum alkyl compound and free oxygen is sufficient to drive the temperature up to 60° C. or more. At this temperature and above the 2,2'-azobis[isobutyronitrile] decomposes and reacts as both a blowing agent and a catalyst. Acting in the latter capacity, the 2,2'-azobis[isobutyronitrile] causes the heat of polymerization to increase still higher thus increasing its own rate of decomposition and accompanying foaming action on the polymer. However, if desired, heat may be added from an external source to the system to increase the rate of formation of the foamed product still further. However care must be exercised to see that the solution has sufficient viscosity to entrap the nitrogen in the polymeric solution before external heat is applied thereto.

The ratio of the aluminum alkyl compound to free oxygen is not critical. The invention is operable within a broad range of aluminum alkyl compound to free oxygen mole ratios. Air can be substituted for free oxygen in the catalyst system as long as sufficient air is used to meet the minimum free oxygen requirement of the catalyst system. Thus it is possible to expose the vinylidene monomer, aluminum alkyl compound, 2,2'-azobis[isobutyronitrile] and multifunctional monomer system to the atmosphere to polymerize and foam the vinylidene monomer. A minimum free oxygen to aluminum alkyl compound mole ratio is 0.0001:1 respectively. As a general rule the reaction rate increases as the number of moles of free oxygen is more nearly equivalent to or greater than the number of moles of aluminum alkyl compound present in the catalyst. When the minimum free oxygen to aluminum alkyl compound mole ratio is used and the reaction is initiated at room temperature or below, it may be necessary to add external heat to the system to insure that the decomposition temperature of the 2,2'-azobis[isobutyronitrile] i.e. at least 60° C. is attained.

The amount of 2,2'-azobis[isobutyronitrile] employed is dependent on the density desired in the foamed product. Obviously the greater the amount of 2,2'-azobis[isobutyronitrile] present the less the resulting density of the foamed product. A minimum amount of 2,2'-azobis[isobutyronitrile] operable in the instant invention as a catalyst and foaming agent is 0.05% based on the weight of monomer being polymerized. Amounts of 2,2'-azobis[isobutyronitrile] in the range 0.05 to 10% by weight of monomer being polymerized are operable; a preferred range is 0.05 to 10%.

The function of the multifunctional monomer, e.g. triallyl cyanurate,

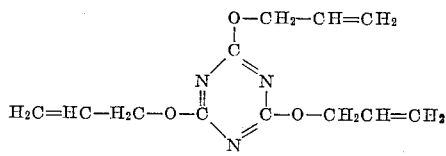

is to act as a crosslinking agent during the reaction thereby adding sufficient rigidity to the polymer as to allow the formation of a stable cellular or foamed polymeric product. The omission of the multifunctional monomer from the instant invention yields a foamed product which is dimensionally unstable. This will be shown in an example hereinafter.

As used herein, the term "multifunctional monomer" means monomers whose structure contains more than one independently polymerizable double bond.

The multifunctional monomer is added in an amount ranging from 1–33% by weight based on the weight of the monomer being polymerized preferably 10–33% by weight. If less multifunctional monomer is added, the crosslinking is insufficient to support the foamed cell structures. If an amount in excess of the aforesaid multifunctional monomer range is added, the product crosslinks to too great an extent prior to the initiation of the foaming step at about 60° C. This results in a fairly rigid poorly foamed product having a relatively high density and a non-uniform cell structure.

Preformed polymer, when added to increase the viscosity of the formulation, is usually added in an amount up to 20% by weight of the total formulation. Preferably in most instances an additional of 10% prepolymer by weight of the total formulation is sufficient. The addition of preformed polymers, e.g. polybutyl methacrylate, polyvinyl acetate etc. to the system increases the viscosity of the solution being polymerized thereby insuring that the polymer solution is sufficiently viscous at the time the 2,2'-azobis[isobutyronitrile] and any auxiliary blowing agents decompose to trap the nitrogen gas evolved.

Plasticizers, such as commercially available polyesters, when added to the formulation to increase flexibility, are usually added in amounts up to 20% by weight of the total formulation.

The following examples will aid in understanding the invention but are not to be deemed as limiting its scope.

*Example 1*

20.0 cc. butyl acrylate distilled at 69° C. and 50 mm. pressure along with 5.0 cc. of dry distilled n-heptane, 5.479 g. of triallyl cyanurate and 0.044 g. 2,2'-azobis[isobutyronitrile] were charged to a 150 cc. beaker containing a magnetic stirring bar. The beaker was placed on a hot plate and stirring was continued until the triallyl cyanurate and the 2,2'-azobis[isobutyronitrile] went into solution at a temperature of 50° C. At this temperature 3.0 cc. of a 26.5% diisobutyl aluminum hydride in n-heptane solution was added to the beaker and the hot plate was turned off. The exotherm caused the temperature to rise to 90° C. and the viscosity of the solution increased. At 90° C. the mixture started to foam and continued foaming while the temperature ranged from 90–121° C. The foamed product on cooling had a cell structure and a volume approximately 3 times its original volume. No shrinking, warpage or cracking was noted 30 days later.

*Example 2*

30.0 cc. butyl acrylate, 3.0025 g. triallyl cyanurate and 0.0982 g. 2,2'-azobis[isobutyronitrile] were charged to a 150 cc. beaker maintained at room temperature. After the triallyl cyanurate 2,2'-azobis[isobutyronitrile] dissolved in the butyl acrylate the solution was cooled to 14° C. in an ice bath and 3.5 cc. of diisobutyl aluminum hydride-butyl acrylate complex (1:1 mole ratio) containing 1.692 g. diisobutyl aluminum hydride was added to the beaker. Within 3 minutes the temperature rose to 60° C. During the temperature rise 100 cc. of pure oxygen was injected into the viscous mass to insure complete polymerization below its atmospheric surface. When the viscosity of the mass was too high for the magnetic stirring bar to rotate, the bar was removed and the beaker was placed in an oven maintained at a temperature of 95° C. After 3 minutes the beaker was removed from the oven and cooled to room temperature. The expanded polymer product was a slightly tacky rubbery material with medium to large cellular structure, i.e., 0.1 to 0.5 cm. in diameter. No shrinking, warpage or cracking was noted 30 days later.

Example 2 was repeated except that 3.0 g. allyl acrylate in one instance and 3.0 g. allyl methacrylate in another instance was substituted for the triallyl cyanurate. In both instances a stable foamed product resulted.

To show the instability of the cellular product formed by the process of the instant insertion in the absence of a multifunctional monomer, the following run was made.

*Example 3*

20.0 cc. butyl acrylate (17.88 g.) distilled at 69° C. and 50 mm. pressure was charged to a 150 ml. beaker containing a magnetic stirring bar. 0.0225 g. of 2,2'-azobis[isobutylronitrile] was added to the beaker with stirring at room temperature. 3.0 cc. of a 26.5% diisobutyl aluminum hydride in n-heptane solution weighing 0.795 g. was added to the beaker at room temperature while stirring. The exotherm reaction recorded a temperature of 92° C. during the formation of a foamed product seven times as large as the original volume of the reactants. The cellular product, which was spongy, elastomeric and slightly tacky, on cooling to room temperature collapsed to its original volume.

The following table shows the variations in density of the foamed product afforded by varying the amount of the multifunctional monomer in the formulation. The multifunctional monomer employed in the examples in Table I was triallyl cyanurate. In all the examples in Table I the triallyl cyanurate and 2,2'-azobis[isobutyronitrile] were dissolved with stirring by a magnetic stirring bar in the butyl acrylate monomer at a temperature in the range 25–40° C. and then the talcum powder filler was added. The formulation was then cooled to 10–20° C. and 3.5 cc. of diisobutyl aluminum hydride-butyl acrylate complex (1:1 mole ratio) was added to the open beaker containing said formulation. 100 cc. oxygen was injected by hypodermic syringe below the atmospheric surface of the polymer solution to insure complete polymerization. When the viscosity of the formulation, due to polymerization, was such as to render ineffective magnetic stirring, the beaker was placed in an over maintained at 95° C. After a period of 3–5 minutes the beaker was removed from the oven and cooled to room temperature. Samples of the cellular product were measured for density by weighing a measured cube sample.

proved as is shown by the following examples in Table II. The runs in Table II were made in accordance with the procedure given for the runs in Table I with the addition that the propolymer, i.e., polybutylmethacrylate, and the plasticizer, were dissolved in the butyl acrylate monomer prior to the addition of the filler.

*Example 16*

30.0 cc. (27.72 g.) of commercially available ethyl acrylate were charged to a 150 cc. beaker containing a magnetic stirring bar. The beaker was placed on a hot plate and 3.0051 g. of triallyl cyanurate were dissolved in the ethyl acrylate along with 0.098 g. to 2,2'-azobis[isobutyronitrile] at a temperature in the range 25–39° C. 6.0091 g. of talcum powder as filler were added to the beaker. The beaker was cooled to 12° C. and 3.5 cc. of a diisobutyl aluminum hydride-butyl acrylate complex (1:1 mole ratio) containing 1.692 g. diisobutyl aluminum hydride, was slowly added to the beaker. 100 cc. of oxygen was injected into the mixture to insure complete polymerization below its atmospheric surface during the exothermic temperature rise from 12 to 63° C. within a 5 minute period. The beaker containing the viscous semisolid material was placed in an oven at 95° C., wherein it expanded in 5 minutes. The resulting cellular product was a very tough sponge with large cell structure, good flexibility and rebound.

Example 16 was repeated except that 4.0 g. triallyl aconitate was substituted for the triallyl cyanurate. A stable foamed product resulted after the viscous mass

TABLE I

| Example No. | Run No. | Butyl Acrylate (g.) | Triallyl Cyanurate (g.) | 2,2'-azobis [isobutyronitrile] (g.) | Catalyst Complex[a] (cc.) | Talcum Powder (g.) | Density of Cellular Product (lbs./ft.$^3$) | Remarks |
|---|---|---|---|---|---|---|---|---|
| 4 | 1006-34 | 26.820 | 1.0053 | 0.0989 | 3.5 | 10.0040 | | Very poor cell structure. |
| 5 | 1006-31 | 26.820 | 3.0057 | 0.0981 | 3.5 | 10.0063 | 16.2 | Very flexible, uniform cell structure. |
| 6 | 1006-32 | 26.820 | 6.0035 | 0.0982 | 3.5 | 10.0044 | 23.2 | Flexible, medium size uniform cell structure.[b] |
| 7 | 1006-35 | 26.820 | 9.0056 | 0.0976 | 3.5 | 10.0067 | 27.2 | Poor flexibility, medium size uniform cell structure. |
| 8 | 1006-36 | 26.820 | 12.0113 | 0.0978 | 3.5 | 10.0037 | 34.3 | Very poor flexibility, large non-uniform cell structure. |

[a] Catalyst complex consists of diisobutyl aluminum hydride complexed with butyl acrylate in a 1:1 mole ratio. Complex contains 1.692 g. diisobutyl aluminum hydride.
[b] Size of cell structure: small 0.1 cm. or less; medium 0.1–0.3 cm.; large 0.3 cm. or greater in diameter.

TABLE II

| Example No. | Run No. | Butyl Acrylate (g.) | Triallyl Cyanurate (g.) | 2,2'-azobis [isobutyronitrile] (g.) | Catalyst Complex[a] (cc.) | Filler (g.) | Prepolymer[d] (g.) | Plasticizer[e] (g.) | Density of Cellular Product (lbs./ft.$^3$) | Remarks |
|---|---|---|---|---|---|---|---|---|---|---|
| 9 | 1016-2 | 26.820 | 12.0027 | 0.0979 | 3.5 | [b] 10.0057 | | 5.1403 | 26.8 | Flexible, medium size cell structure.[f] |
| 10 | 1016-4 | 26.820 | 12.0055 | 0.0985 | 3.5 | [b] 10.0039 | 5.0015 | 5.2026 | 23.2 | Fair flexibility, small size cell structure. |
| 11 | 1006-30 | 26.820 | 3.0054 | 0.0973 | 3.5 | [b] 10.0051 | 5.0032 | | 18.6 | Fair flexibility, medium size cell structure. |
| 12 | 1016-16 | 26.820 | 3.0039 | 0.0980 | 3.5 | [b] 10.0036 | 5.0047 | 5.4839 | 13.6 | Soft rubbery material, medium to large cell structure. |
| 13 | 1006-43 | 26.820 | 3.0042 | 0.0975 | 3.5 | [c] 5.0014 | 5.0049 | | 16.4 | Very flexible, small uniform cell structure. |
| 14 | 1006-38 | 26.820 | 3.0025 | 0.0983 | 3.5 | [b] 10.0023 | | 5.3387 | 22.4 | Do. |
| 15 | 1016-5 | 26.820 | 6.0045 | 0.0982 | 3.5 | [b] 10.0050 | | 5.2492 | 23.8 | Flexible, medium to large cell structure. |

[a] Catalyst complex consists of diisobutyl aluminum hydride complexed with butyl acrylate in a 1:1 mole ratio. Contains 1.692 g. diisobutyl aluminum hydride.
[b] Talcum powder (Allied Chemical Co.).
[c] Kaolin clay.
[d] Polybutyl methacrylate.
[e] Paraplex G-50 (Rohm & Haas Co.) Wgt. Av. Molecular Wgt.=2200, Sp. Gr. 1.08. Commercially available polyester.
[f] Size of cell structure: Small 0.1 cm. or less; Medium 0.1–0.3 cm.; Large 0.3 cm. or greater in diameter.

It can be seen from Table I that increasing the amount of triallyl cyanurate increases the density and decreases the flexibility of the cellular product. By proper selection of fillers, prepolymers and plasticizers the density, flexibility and cell structure of the polymer can be improved was exposed to an oven temperature of 95° C. for 5 minutes.

Example 16 was again repeated substituting 4.5 g. of diallyl oxalate for the triallyl cyanurate. A stable foamed polyethyl acrylate product resulted.

The acrylic esters of the instant invention can be copolymerized with each other readily in any weight ratio to form a stable foam. In addition the acrylic esters will copolymerize with vinyl esters such as vinyl acetate. Vinyl acetate can be present in the copolymer in amounts ranging from 1 to 75% by weight of the copolymer.

The following examples in Table III show a few of the various cellular copolymers which can be made by this invention. The procedure followed for the examples in Table III was to charge to a beaker containing a magnetic stirring bar on a hot plate at a temperature in the range 25–40° C., the monomers to be copolymerized and any prepolymer utilized. Next the triallyl cyanurate, and 2,2'-azobis[isobutyronitrile] are dissolved therein followed by the addition of any filler that is employed. The beaker is cooled to 10–12° C. and the complexed aluminum alkyl compound-butyl acrylate is added to the open beaker. During the exothermic reaction 100 cc. oxygen is added by hypodermic syringe to the viscous mass below its surface to insure complete polymerization. When the temperature of the contents of the beaker reaches 60–70° C. and the mass is highly viscous, the beaker is transferred to an oven at 95° C. wherein the expansion of the copolymerized material is completed.

It should be noted that it is not necessary to transfer the polymerizing material to an oven. As long as the exothermic temperature during the polymerization reaction between the oxygen and the aluminum alkyl compound catalyst system reaches the decomposition temperature of the 2,2'-azobis[isobutyronitrile] i.e. 60–70° C. the foaming reaction will proceed. However to insure cell formation in a relatively short period, i.e. 1–5 minutes, the foaming step is usually performed in an oven at about 90–150° C.

150 cc. beaker containing a magnetic stirring bar. The beaker was placed on a hot plate at 50° C. to aid in dissolving the ingredients in the monomer. After dissolution was complete 0.5374 g. of titanium dioxide as a filler were added to the solution followed by the addition of 2.0 cc. of a 34.26% diisobutyl aluminum hydride in n-heptane solution. The temperature due to the exothermic reactions rose to 110° C. whereat foaming occurred and continued on to 162° C. The stable foamed product on cooling contained a large cellular structure.

When 6.5 g. diallyl oxalate was substituted for the diallyl itaconate in Example 22, a stable foamed product resulted.

It should be understood that the aluminum alkyl compound and free oxygen are necessary components of the catalyst system, without either or both of which no polymerization occurs. Even at temperatures above the decomposition temperature of 2,2'-azobis[isobutyronitrile] no polymerization occurs in the absence of either free oxygen or the aluminum alkyl compound. Thus by this invention it is possible to preform stable formulations containing a vinylidene monomer, triallyl cyanurate, 2,2'-azobis[isobutyronitrile] in combination with either, but expressly not both, an aluminum alkyl compound or free oxygen without having polymerization occurring. Obviously since the decomposition of the 2,2'-azobis[isobutyronitrile] is temperature dependent it is necessary to maintain the formulation below the decomposition temperature of the 2,2'-azobis[isobutyronitrile] i.e., about 60° C. to insure that a foamed product will result on exposure to either of the other two catalytic components, i.e., free oxygen or the aluminum alkyl compound. Preferably in making preformed formulations the vinylidene monomer or monomers, triallyl cyanurate, 2,2'-azobis[isobutylronitrile] and the aluminum alkyl

TABLE III

| Example No. | Run No. | Monomers Copolymerized (g.) | Triallyl Cyanurate (g.) | 2,2'-azobis [isobutyronitrile] (g.) | Catalyst Complex (cc.) | Talcum Powder Filler (g.) | Prepolymer (g.) | Remarks |
|---|---|---|---|---|---|---|---|---|
| 17 | 1006–40 | (a) | 3.0041 | 0.0975 | e 3.5 | 10.0009 | | Soft, flexible rubbery sponge; medium cell structure. |
| 18 | 1006–45 | (b) | 3.0048 | 0.0980 | e 3.5 | 10.0062 | | Rubbery, slightly tacky sponge; medium to large cells. |
| 19 | 948–15 | (c) | 9.8049 | 0.0740 | f 5.0 | | | Yellow flexible spongy material, slightly tacky. |
| 20 | 1006–48 | (d) | 3.0011 | 0.0987 | e 3.5 | | h 5.0021 | Fairly tough rubbery flexible material with large cells. | a Butyl acrylate (17.88 g.) and ethyl acrylate (9.24 g.).
b Butyl acrylate (17.88 g.) and vinyl acetate (9.338 g.).
c Butyl acrylate (26.820 g.) and vinyl propionate (9.173 g.).
d Butyl acrylate (17.88 g.), vinyl acetate (4.669 g.) and ethyl acrylate (4.620 g.)
e Catalyst complex consists of diisobutyl aluminum hydride and butyl acrylate in a 1:1 mole ratio. Complex contains 1.356 g. diisobutyl aluminum hydride.
f 26.5% solution of diisobutyl aluminum hydride in n-heptane.
h 5.0021 g. of polybutyl methacrylate.

The catalyst complex of the present invention can be made in the following manner.

*Example 21*

A 50 cc. test tube was deoxygenated in an oven at 120° C. for 2 hours and sealed with a rubber stopper. Two hypodermic needles as gas inlet and outlet were then inserted into the tube through the stopper and nitrogen was passed through the tube. 5 cc. of butyl acrylate (.0349 mole) was injected into the tube by hypodermic syringe and the tube was then cooled in a nice water bath. 6.4 cc. of diisobutyl aluminum hydride (0.349 mole) was slowly injected into the tube by hypodermic syringe. The resulting solution had a volume of 10.25 cc. and turned yellow on the formation of the complex.

The foamed products of this invention have many and varied uses including those now known for commercial vinyl foams. Such uses include sponges, insulating material, cushions and the like.

*Example 22*

40 cc. of butyl acrylate, 6.262 g. polyvinyl acetate, 2.116 g. of diallyl itaconate as a crosslinking agent, 0.0361 g. 2,2'-azobis[isobutyronitrile] were charged to a compound are mixed together in an inert oxygen free atmosphere and when ready for use are exposed to free oxygen such as air at ambient conditions. Hence one such method of forming a foamed polymeric insulation is to charge the monomer or monomers to be polymerized, triallyl cyanurate, 2,2'-azobis[isobutyronitrile] and the aluminum alkyl compound in the absence of free oxygen to a deoxygenated aerosol bomb, pressurize the bomb with nitrogen and thereafter spray the preformed formulation on the part to be insulated and form a foamed polymeric insulation thereon at ambient conditions in the presence of free oxygen, e.g., air.

It should be noted that the formulations herein can contain pigments, plasticizers, fillers, auxiliary blowing agents, prepolymers all within the scope of the invention. Another monomer which is copolymerizable with the vinylidene monomers of the instant invention is maleic anhydride which is shown in some of the examples hereinafter. Maleic anhydride can be present in the formulation in amounts ranging from 1 to 10% based on the weight of the formulation.

Although 2,2'-azobis[isobutyronitrile] was used in the examples herein as a combination catalyst and blowing or foaming agent, various other compounds are operable in this invention as auxiliary blowing agents.

Such auxiliary blowing agents do not act as a catalyst for the polymerization reaction but merely cause foaming at or above their decomposition temperatures. These auxiliary blowing agents are usually employed in combination with 2,2'-azobis[isobutyronitrile]. They may also be used to form foamed products when the catalyst system consists of an aluminum alkyl compound and oxygen. Examples of operable auxiliary blowing agents include, but are not limited to, diazoaminobenzene, N,N'-dimethyl-N,N'-dinitrosoterephthalamide, N,N'-dinitrosopentamethylenetetramine, benzenesulfonyl-hydrazide and benzene-1,3-disulfonyl-hydrazide. The important factor to keep in mind when selecting an auxiliary blowing agent is its decomposition temperature. Any known auxiliary blowing agent having a decomposition temperature in the range 50 to 150° C. is operable. In some instances where the decomposition temperature of the blowing agent is above the temperature reached by the exothermic reaction of the aluminum alkyl compound and free oxygen, it will be necessary to add external heat to the system to cause foaming.

The following examples in Table IV show various formulations operable in the instant invention and characterization of the foamed polymeric product. The procedure followed is the same as that for the examples in Table III except that any plasticizer employed was added to the formulation prior to adding the filler.

ing the original thickness prior to the 90% Compression Set and then measuring the thickness 1 minute after release of the pressure in the Compression Set at 90% i.e.

Percent Recovery =

$$\frac{\text{Thickness 1 minute after pressure released in 90\% Compression Set}}{\text{Original thickness}} \times 100$$

The procedure followed for forming the foamed products in the examples in Table V was the same as that used for the examples in Table IV.

Example 40

30.0 cc. methyl methacrylate, 3.0 g. triallyl cyanurate and 0.098 g. 2,2'-azobis[isobutyronitrile] were charged to a 150 cc. beaker containing a magnetic stirring bar. The beaker was placed on a hot plate at 35° C. and stirring continued until the triallyl cyanurate and the 2,2'-azobis[isobutyronitrile] went into solution. 3.5 cc. of diisobutyl aluminum hydride-butyl acrylate complex (1:1 mole ratio) containing 1.692 g. diisobutyl aluminum hydride was then added to the beaker. Within 5 minutes the temperature rose above 65° C. During the temperature rise, 200 cc. of air was injected into the semiviscous mass to insure complete polymerization below its atmospheric surface. When the viscosity was sufficient to impair rotation of the magnetic stirring bar at a temperature of 70° C. the bar was removed and the

TABLE IV

| Example No. | Monomer (g.) | Triallyl Cyanurate (g.) | 2,2'-azobis-[isobutyronitrile] (g.) | Catalyst | Filler (g.) | Prepolymer (g.) | Plasticizer (g.) | Density of Cellular Product (lbs./ft.³) | Percent Volume Increase of Cellular Product | Remarks |
|---|---|---|---|---|---|---|---|---|---|---|
| 23 | a 26.8 | 6.01 | 0.097 | 3.5 cc.b | | | | 22.7 | 200–300 | Stable foamed material |
| 24 | c 36.04 | 5.96 | 0.0737 | 1.24 g.d | e 0.5 | f 7.25 | | 11.8 | 500 | Do. |
| 25 | a 35.7 | 6.38 | 0.065 | 1.15 g.g | e 0.5 | h 8.78 | | 9.3 | 400 | Do. |
| 26 | i 27.9 | 3.00 | 0.50 | 3.5 cc.b | j 10.01 | k 5.00 | m 5.41 | 8.2 | | Do. |
| 27 | j 27.9 | 3.00 | 0.099 | 3.5 cc.b | j 10.01 | k 5.00 | m 5.31 | 12.8 | | Do. | a Butyl acrylate.
b Catalyst complex consisting of diisobutyl aluminum hydride complexed with butyl acrylate in 1:1 mole ratio.
c Comonomers i.e. 9.24 g. ethyl acrylate and 26.8 g. butyl acrylate.
d Diisobutyl aluminum hydride.
e Titanium dioxide.
f Prepolymer consists of 2.16 g. polybutyl acrylate and 5.09 g. polyvinyl acetate.
g Diethyl aluminum chloride.
h Prepolymer consists of 2.85 g. polybutyl methacrylate and 5.93 g. polyvinyl acetate.
i Comonomers i.e. 24.1 g. butyl acrylate, 2.80 g. vinyl acetate and 1.0 g. maleic anhydride.
j Talcum powder.
k Polybutyl methacrylate.
m Paraplex G-50 (wgt. Av. Molecular Wgt.=2200, Sp. Gr. 1.08). Commercially available polyester from Rohm & Haas Co.

TABLE V

| Example No. | Run No. | Butyl Acrylate (g.) | Monomers Vinyl Acetate (g.) | Monomers Ethyl Acrylate (g.) | Maleic Anhydride (g.) | 2,2'-azobis-[isobutyronitrile] (g.) | Prepolymer a (g.) | Plasticizer b (g.) | Triallyl Cyanurate (g.) | Filler (g.) | Catalyst d (cc.) | Density, lbs./ft.³ | Compression Set=90%, lbs./ft.³ | Percent Recovery after 1 minute |
|---|---|---|---|---|---|---|---|---|---|---|---|---|---|---|
| 28 | 1006-3 | 24.138 | 2.8014 | | 1.0047 | 0.0998 | 5.0053 | 5.3157 | 3.0134 | c10.0006 | 3.5 | 12.8 | 94 | 98.8 |
| 29 | 1006-10 | 17.880 | 9.3380 | | 1.0022 | 0.0968 | 5.0067 | 5.3523 | 3.0039 | c10.0055 | 3.5 | 15.5 | 75 | 95.7 |
| 30 | 1006-11 | 26.820 | | | 1.0049 | 0.0975 | 5.0088 | 5.4680 | 3.0037 | c10.0058 | 3.5 | 13.6 | 413 | 92.1 |
| 31 | 1006-13 | 24.138 | 2.8014 | | | 0.0988 | 5.0097 | 5.3071 | 3.0059 | c10.0029 | 3.5 | 13.6 | 42 | 85.2 |
| 32 | 1006-19 | 24.138 | 2.8014 | | 1.0051 | 0.0981 | 9.0053 | 5.5170 | 3.0035 | c 3.0023 | 3.5 | 17.9 | 850 | 84.0 |
| 33 | 1006-40 | 17.880 | | 9.240 | | 0.0975 | | | 3.0041 | c10.0009 | 3.5 | 12.1 | 454 | 90.0 |
| 34 | 1006-42 | 17.880 | | 9.240 | | 0.0978 | 5.0026 | | 6.0052 | c10.0046 | 3.5 | 21.1 | 3,250 | 40.5 |
| 35 | 1016-14 | 26.820 | | | | 0.0977 | 2.0044 | | 3.0011 | c10.0044 | 3.5 | 20.9 | 1,970 | 98.5 |
| 36 | 1016-15 | 26.820 | | | | 0.0983 | 2.0051 | | 6.0053 | c10.0035 | 3.5 | 21.7 | 2,150 | 89.5 |
| 37 | 1016-17 | 26.820 | | | | 0.0980 | 10.0052 | | 3.0029 | c10.0037 | 3.5 | 21.4 | 3,435 | 34.0 |
| 38 | 1016-31 | 24.138 | 2.8014 | | 1.0061 | 0.0982 | 8.0049 | 5.3904 | 3.0060 | c10.0056 | 3.5 | 18.0 | 135 | 92.0 |
| 39 | 1016-48 | 24.138 | 2.8014 | | 1.0020 | 0.0982 | 5.0066 | 5.1562 | 3.0030 | f10.0029 | 3.5 | 7.2 | 4.25 | 88.6 | a Polybutyl methacrylate.
b Paraplex G-50 (Wgt. Av. Molecular Wgt.=2200, Sp. Gr. 1.08). Commercially available polyester from Rohm & Haas Co.
c Talcum powder.
d Catalyst complex consisting of diisobutyl aluminum hydride complexed with butyl acrylate in a 1:1 mole ratio.
e Calk.
f 5.0021 g. talcum powder and 5.0008 g. Fe₂O₃

The following examples in Table V show the physical properties obtainable by varying the formulation of the instant invention. The data for Compression Set at 90% was obtained in accordance with ASTM D1621–59T. The data for Percent Recovery was obtained by measurbeaker placed in an oven at 95° C. After 5 minutes the beaker was removed from the oven and cooled to room temperature. A stable foamed polymethyl methacrylate polymer product with medium to large cell size, i.e. 0.1 to 0.5 cm. in diameter, resulted.

Example 41

Example 40 was repeated except that 35.0 cc. of acrylamide was substituted for the methyl methacrylate. A stable foamed fairly rigid polyacrylamide product resulted. Example 41 was repeated with 5.10 g. of Paraplex G–50, a commercially available polyester from Rohm & Haas Co., having a weight average molecular weight of 2200 and a specific gravity of 1.08 added to and dissolved in the formulation on the hot plate. The contents of the beaker were transferred to an oven at 95° C. after maintaining the viscous mass for 5 minutes at a temperature in excess of 60° C. due to the exothermic reaction. The stable foamed polyacrylamide product was more flexible then the polyacrylamide product obtained in the absence of Paraplex G–50.

Example 42

The procedure and reactants of Example 40 were used except that 28 cc. of vinyl acetate was substituted for the methyl methacrylate and 5.010 g. of polybutyl methacrylate was added to and dissolved in the formulation. The stable foamed polyvinyl acetate product was fairly gummy and contained cells of 0.1 to 0.5 cm. in diameter.

Example 43

Example 42 was repeated except that 29 cc. of vinyl propionate was substituted for the vinyl acetate. A stable foamed gummy polyvinyl propionate product was obtained.

Example 44

Example 40 was repeated with 30.0 cc. of n-butyl methacrylate being used as the monomer instead of methyl methacrylate. A stable foamed fairly rigid polybutyl methacrylate product in good yield resulted.

Example 45

The procedure and reactants of Example 40 were used except that 30 cc. of methyl acrylate was substituted for the methyl methacrylate. A stable foamed polymethyl acryla product of good flexibility was obtained in good yield.

Example 46

The procedure and reactants of Example 40 were repeated except that 30 cc. of vinyl-2-chloroethyl ether was substituted for the methyl methacrylate. A stable foamed polyvinyl-2-chloroethyl ether in fair yield was obtained. The foamed product had cells of 0.1 to 0.5 cm. in diameter.

Example 47

The procedure and reactants of Example 40 were employed with the exception that 28 cc. of vinyl-2-methoxy ethyl ether was substituted for the methyl methacrylate. After 10 minutes in the oven at 95° C. a stable foamed product in fair yield resulted on cooling.

Example 48

35 cc. styrene, 3.5 g. triallyl cyanurate and 0.103 g. 2,2′-azobis[isobutyronitrile] were charged to 150 cc. beaker containing a magnetic stirring bar. The beaker was placed on a hot plate at 35° C. and stirring continued until the triallyl cyanurate and the 2,2′-azobis [isobutyronitrile] went into solution. 3.5 cc. of diisobutyl aluminum hydride-butyl acrylate complex (1:1 mole ratio) containing 1.692 g. diisobutyl aluminum hydride was then added to the beaker. The temperature rose to 70° C. within 6 minutes. 100 cc. air was injected into the semi-viscous mass to insure complete polymerization below the surface.

The magnetic stirring bar was removed and the beaker placed in an oven set at 90° C. for 5 minutes. After cooling a foamed polystyrene product with medium to large cell size, i.e., 0.1 to 0.5 cm. in diameter, resulted.

Example 49

Example 48 was repeated except that 5 cc. of styrene and 30 cc. of butyl acrylate were used as the vinylidene monomer charge. The resultant stable foamed product formed had a medium to large cell size.

Example 50

Example 48 was repeated using 30.0 cc. p-bromostyrene. The stable foamed product resulting had a medium to large cell size.

Example 51

Example 48 was repeated except that 30.0 cc. methacrylamide was substituted for styrene. The foamed polymethacrylamide had a small cell structure, i.e., 0.1 cm. or less in diameter.

Example 52

Example 48 was repeated except that 30.0 cc. N-phenylmethacrylamide was used as the vinylidene monomer and the oven temperature was 125° C. The foamed product had large cells, 0.3 cm. or greater in diameter.

What is claimed is:

1. The process of forming a stable cellular crosslinked polymeric composition from a non-gaseous polymerizable monoethylenic vinylidene monomer having aliphatic carbon to carbon unsaturation solely in the double bond in the vinylidene radical selected from the group consisting of:

(1) Esters of acrylic and methacrylic acid of the formula:

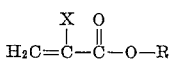

wherein X is a member of the group consisting of hydrogen and methyl and R is a hydrocarbon radical of the group consisting of alkyl and aryl, said radical members contining up to 18 carbon atoms, (2) Vinyl esters of saturated monocarboxylic acids of the formula:

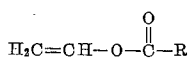

wherein R is a radical of the group consisting of alkyl and aryl, said radical members containing up to 18 carbon atoms, (3) Vinyl ethers of the formula:

$$H_2C=CH-O-R$$

wherein R is an alkyl containing 1 to 18 carbon atoms, (4) Amides of acrylic and methacrylic acid of the formula:

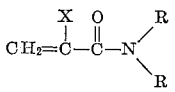

wherein X is a member of the group consisting of hydrogen and methyl and R is a radical of the group consisting of alkyl and aryl, said radicals not necessarily being the same and containing in combination up to 18 carbon atoms, (5) Vinyl ketones of the formula:

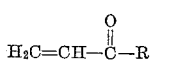

wherein R is a radical of the group consisting of alkyl and aryl, said radical members containing up to 18 carbon atoms, (6) Styrenes of the formula:

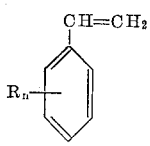

wherein $n$ is an integer from 1 to 3 and R is a member of the group consisting of halogen, hydrogen, alkoxy and alkyl, said alkoxy and alkyl members containing 1 to 4 carbon atoms which comprises contacting said vinylidene monomer under ambient conditions with an aluminum alkyl compound of the formula $$\begin{array}{c} R \\ \diagdown \\ Al-R' \\ \diagup \\ R \end{array}$$

wherein R is an alkyl and R' is a member of the group consisting of hydrogen, chlorine and an alkyl, all of said alkyl groups containing 1–8 carbon atoms in the presence of free oxygen, 2,2'-azobis[isobutyronitrile] and a multifunctional monomer selected from the group consisting of triallyl cyanurate, allyl acrylate, allyl methacrylate, diallyl itaconate, triallyl aconitate and diallyl oxalate.

2. The process according to caim 1 in which the free oxygen is present in an amount of at least 0.0001 mole of free oxygen per mole of aluminum alkyl compound, the mole ratio of the aluminum alkyl compound to polymerizable vinylidene monomer is in the range 0.001 to 0.1:1 respectively, the 2,2'-azobis[isobutyronitrile] is present in an amount equal to 0.05 to 10% by weight of the polymerizable vinylidene monomer and the multifunctional monomer is present in an amount in the range of 1 to 33% by weight of the polymerizable vinylidene monomer.

3. The process according to claim 1 wherein prior to contact with the vinylidene monomer, the aluminum alkyl compound is complexed in an inert oxygen free atmosphere in a 1:1 mole ratio with monocarboxylic esters of the formula:

$$R_1-\overset{\overset{\displaystyle O}{\|}}{C}-O-R_2$$

wherein $R_1$ and $R_2$ are alkyl groups containing in combination up to 20 carbon atoms.

4. The process of forming a stable cellular crosslinked polymeric composition which comprises forming a mixture in an oxygen-free atmosphere consisting essentially of (A) a non-gaseous polymerizable monoethylenic vinylidene monomer having aliphatic unsaturation solely in the double bond in the vinylidene radical selected from the group consisting of:

(1) Esters of acrylic and methacrylic acid of the formula:

$$H_2C=\overset{\overset{\displaystyle X}{|}}{C}-\overset{\overset{\displaystyle O}{\|}}{C}-O-R$$

wherein X is a member of the group consisting of hydrogen and methyl and R is a hydrocarbon radical of the group consisting of alkyl and aryl, said radical members containing up to 18 carbon atoms, (2) Vinyl esters of saturated monocarboxylic acids of the formula:

$$H_2C=CH-O-\overset{\overset{\displaystyle O}{\|}}{C}-R$$

wherein R is a radical of the group consisting of alkyl and aryl, said radical members containing up to 18 carbon atoms, (3) Vinyl ethers of the formula:

$$H_2C=CH-O-R$$

wherein R is an alkyl containing 1 to 18 carbon atoms, (4) Amides of acrylic and methacrylic acid of the formula:

$$CH_2=\overset{\overset{\displaystyle X}{|}}{C}-\overset{\overset{\displaystyle O}{\|}}{C}-N\diagup^{R}_{\diagdown R}$$

wherein X is a member of the group consisting of hydrogen and methyl and R is a radical of the group consisting of alkyl and aryl, said radicals not necessarily being the same and containing in combination up to 18 carbon atoms, (5) Vinyl ketones of the formula:

$$H_2C=CH-\overset{\overset{\displaystyle O}{\|}}{C}-R$$

wherein R is a radical of the group consisting of alkyl and aryl, said radical members containing up to 18 carbon atoms, (6) Styrenes of the formula:

$$R_n-\underset{}{\bigcirc}-CH=CH_2$$

wherein $n$ is an integer from 1 to 3 and R is a member of the group consisting of halogen, hydrogen, alkoxy and alkyl, said alkoxy and alkyl members containing 1 to 4 carbon atoms, (B) an aluminum alkyl compound of the formula $$\begin{array}{c} R \\ \diagdown \\ Al-R' \\ \diagup \\ R \end{array}$$

wherein R is an alkyl and R' is a member of the group consisting of hydrogen, chlorine and an alkyl, all of said alkyl groups having 1 to 8 carbon atoms, (C) 2,2'-azobis[isobutyronitrile] and (D) a multifunctional monomer selected from the group consisting of triallyl cyanurate, allyl acrylate, allyl methacrylate, diallyl itaconate, triallyl aconitate and diallyl oxalate, and thereafter exposing said mixture to free oxygen.

5. The process according to claim 4 wherein prior to contact with the vinylidene monomer, the aluminum alkyl compound is complexed in an inert oxygen free atmosphere in a 1:1 mole ratio with monocarboxylic esters of the formula:

$$R_1-\overset{\overset{\displaystyle O}{\|}}{C}-O-R_2$$

wherein $R_1$ and $R_2$ are alkyl groups containing in combination up to 20 carbon atoms.

6. The process according to claim 4 in which the free oxygen is present in an amount of at least 0.0001 mole of free oxygen per mole of aluminum alkyl compound, the mole ratio of the aluminum alkyl compound to polymerizable vinylidene monomer is in the range 0.001 to 0.1:1 respectively, the 2,2'-azobis[isobutyronitrile] is present in an amount equal to 0.05 to 10% by weight of the polymerizable vinylidene monomer and the multifunctional monomer is present in an amount in the range of 1 to 33% by weight of the polymerizable vinylidene monomer compound.

7. A composition of matter suitable for forming a stable cellular crosslinked polymeric composition on exposure to free oxygen which comprises a formulation consisting essentially of (A) a non-gaseous polymerizable monoethylenic vinylidene monomer having aliphatic carbon to carbon unsaturation solely in the double bond in the vinylidene radical selected from the group consisting of:

(1) Esters of acrylic and methacrylic acid of the formula:

$$H_2C=\overset{\overset{\displaystyle X}{|}}{C}-\overset{\overset{\displaystyle O}{\|}}{C}-O-R$$

wherein X is a member of the group consisting of hydrogen and methyl and R is a hydrocarbon radical of the group consisting of alkyl and aryl, said radical members containing up to 18 carbon atoms, (2) Vinyl esters of saturated monocarboxylic acids of the formula:

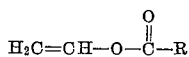

wherein R is a radical of the group consisting of alkyl and aryl, said radical members containing up to 18 carbon atoms, (3) Vinyl ethers of the formula:

$$H_2C=CH—O—R$$

wherein R is an alkyl containing 1 to 18 carbon atoms, (4) Amides of acrylic and methacrylic acid of the formula:

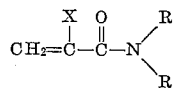

wherein X is a member of the group consisting of hydrogen and methyl and R is a radical of the group consisting of alkyl and aryl, said radicals not necessarily being the same and containing in combination up to 18 carbon atoms, (5) Vinyl ketones of the formula:

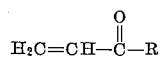

wherein R is a radical of the group consisting of alkyl and aryl, said radical members containing up to 18 carbon atoms, (6) Styrenes of the formula:

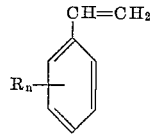

wherein $n$ is an integer from 1 to 3 and R is a member of the group consisting of halogen, hydrogen, alkoxy and alkyl, said alkoxy and alkyl members containing 1 to 4 carbon atoms, (B) an aluminum alkyl compound of the formula

wherein R is an alkyl and R' is a member of the group consisting of hydrogen, chlorine and an alkyl, all of said alkyl groups containing 1 to 8 carbon atoms, the mole ratio of said aluminum alkyl compound to said vinylidene monomer being in the range 0.001 to 0.1:1 respectively, (C) an amount equal to 0.05 to 10% by weight of said vinylidene monomer of 2,2'-azobis[isobutyronitrile] and (D) an amount equal to 1 to 33% by weight of said vinylidene monomer of a multifunctional monomer selected from the group consisting of triallyl cyanurate, allyl acrylate, allyl methacrylate, diallyl itaconate, triallyl aconitate and diallyl oxalate.

8. The composition according to claim 7 wherein prior to contact with the vinylidene monomer, the aluminum alkyl compound is complexed in an inert oxygen free atmosphere in a 1:1 mole ratio with monocarboxylic esters of the formula:

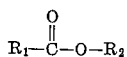

wherein $R_1$ and $R_2$ are alkyl groups containing in combination up to 20 carbon atoms.

9. The process of forming stable cellular crosslinked butyl acrylate triallyl cyanurate copolymer composition which comprises contacting under ambient conditions butyl acrylate monomer with a catalyst consisting essentially of free oxygen and an aluminum alkyl compound of the formula

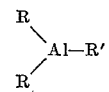

wherein R is an alkyl and R' is a member of the group consisting of hydrogen, chlorine and an alkyl, all of said alkyls containing 1–8 carbon atoms in the presence of 1–33% triallyl cyanurate based on the weight of butyl acrylate and at least 0.05% 2,2'azobis[isobutyronitrile] by weight of said butyl acrylate monomer.

10. The process according to claim 9 wherein, prior to contact with the vinylidene monomer, the aluminum alkyl compound is complexed in an inert oxygen free atmosphere in a 1:1 mole ratio with monocarboxylic esters of the formula:

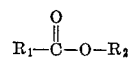

wherein $R_1$ and $R_2$ are alkyl groups containing in combination up to 20 carbon atoms.

11. The process according to claim 10 wherein the butyl acrylate monomer to be polymerized is copolymerized with vinyl acetate.

12. The process of forming stable cellular crosslinked ethyl acrylate triallyl cyanurate copolymer composition which comprises contacting under ambient conditions ethyl acrylate monomer with a catalyst consisting essentially of free oxygen and an aluminum alkyl compound of the formula

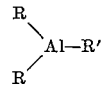

wherein R is an alkyl and R' is a member of the group consisting of hydrogen, chlorine and an alkyl, all of said alkyls containing 1–8 carbon atoms in the presence of 10–33% triallyl cyanurate by weight of ethyl acrylate and at least 0.05% 2,2'-azobis[isobutyronitrile] by weight of ethyl acrylate.

13. The process according to claim 12 wherein, prior to contact with the vinylidene monomer, the aluminum alkyl compound is complexed in an inert oxygen free atmosphere in a 1:1 mole ratio with monocarboxylic esters of the formula:

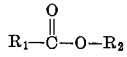

wherein $R_1$ and $R_2$ are alkyl groups containing in combination up to 20 carbon atoms.

14. The process of making a stable cellular crosslinked butyl acrylate triallyl cyanurate copolymer composition which comprises forming a mixture consisting essentially of butyl acrylate monomer, an aluminum alkyl compound of the formula

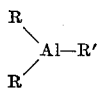

wherein R is an alkyl and R' is a member of the group consisting of hydrogen, chlorine and an alkyl, all of said alkyl groups containing 1 to 8 carbon atoms, 1 to 33% triallyl cyanurate based on the weight of butyl acrylate and at least 0.05% 2,2'-azobis[isobutyronitrile] by weight of butyl acrylate and thereafter exposing said mixture to free oxygen.

15. The process according to claim 14 wherein the mixture contains vinyl acetate monomer.

16. A composition of matter suitable for forming a stable cellular crosslinked butyl acrylate triallyl cyanurate copolymer composition on exposure to free oxygen consisting essentially of butyl acrylate monomer, catalytic amounts of an aluminum alkyl compound of the formula

wherein R is an alkyl and R' is a member of the group consisting of hydrogen, chlorine and an alkyl, all of said alkyl groups containing 1 to 8 carbon atoms, an amount equal to 0.05% to 10% by weight of said butyl acrylate monomer of 2,2'-azobis[isobutyronitrile] and an amount equal to 1 to 33% by weight of said butyl acrylate monomer of triallyl cyanurate.

17. A composition of matter suitable for forming a stable cellular crosslinked ethyl acrylate triallyl cyanurate copolymer composition on exposure to free oxygen consisting essentially of ethyl acrylate monomer, catalytic amounts of an aluminum alkyl compound of the formula

wherein R is an alkyl and R' is a member of the group consisting of hydrogen, chlorine, and an alkyl, all of said alkyl groups containing 1 to 8 carbon atoms, an amount equal to 0.05% to 10% by weight said ethyl acrylate monomer of 2,2'-azobis[isobutyronitrile] and an amount equal to 1 to 33% by weight of said ethyl acrylate monomer of triallyl cyanurate.

References Cited by the Examiner

UNITED STATES PATENTS

| | | | |
|---|---|---|---|
| 2,684,341 | 7/1954 | Anspon et al. | 260—2.5 |
| 2,884,386 | 4/1959 | McMillan et al. | 260—2.5 |
| 2,966,471 | 12/1960 | Anspon | 260—2.5 |
| 3,028,343 | 4/1962 | Anspon | 260—2.5 |
| 3,030,349 | 4/1962 | Stickney et al. | 260—89.5 |
| 3,069,403 | 12/1962 | Prapas | 260—89.5 |
| 3,094,513 | 6/1963 | Kropa | 260—89.5 |
| 3,117,112 | 1/1964 | Mirabile et al. | 260—93.5 |

FOREIGN PATENTS 884,706  12/1961  Great Britain.

OTHER REFERENCES

Schildknecht: Vinyl and Related Polymers, copyright 1952, by John Wiley and Sons Inc., pages 208–211 (copy in Scientific Library).

MURRAY TILLMAN, *Primary Examiner.*

M. FOELAK, *Assistant Examiner.*